(12) United States Patent
Lee et al.

(10) Patent No.: US 12,335,023 B2
(45) Date of Patent: Jun. 17, 2025

(54) TIME SYNCHRONIZATION METHOD AND APPARATUS FOR LOW-ORBIT SATELLITE CLUSTER

(71) Applicant: KOREA UNIVERSITY RESEARCH AND BUSINESS FOUNDATION, Seoul (KR)

(72) Inventors: Sang Hyun Lee, Seoul (KR); Young Chai Ko, Seoul (KR); Yong Hun Jang, Seoul (KR); Jun Young Seo, Anyang-si (KR); Sun Ho Kim, Seoul (KR); Won Young Kang, Daejeon (KR)

(73) Assignee: Korea University Research and Business Foundation, Seoul (KR)

( * ) Notice: Subject to any disclaimer, the term of this patent is extended or adjusted under 35 U.S.C. 154(b) by 244 days.

(21) Appl. No.: 18/078,451

(22) Filed: Dec. 9, 2022

(65) Prior Publication Data

US 2023/0188199 A1     Jun. 15, 2023

(30) Foreign Application Priority Data

Dec. 13, 2021  (KR) .......................... 10-2021-0177311
Apr. 11, 2022  (KR) .......................... 10-2022-0044339

(51) Int. Cl.
    *H04B 7/185*     (2006.01)
(52) U.S. Cl.
    CPC ................... *H04B 7/18513* (2013.01)
(58) Field of Classification Search
    CPC ..................... H04B 7/18513; H04B 7/18
    See application file for complete search history.

(56) References Cited

U.S. PATENT DOCUMENTS

| 11,194,791 B1* | 12/2021 | Baine ..................... G06F 9/54 |
| 11,363,545 B2* | 6/2022 | Heyn ................. H04B 7/18508 |
| 11,570,688 B2* | 1/2023 | Polacheck ......... H04W 56/0015 |
| 2006/0103574 A1* | 5/2006 | Geier ..................... G01S 19/42 |
| | | 342/357.31 |
| 2006/0170590 A1* | 8/2006 | Soman .................... G01S 19/28 |
| | | 342/357.76 |

(Continued)

FOREIGN PATENT DOCUMENTS

| KR | 10-2012-0118397 A | 10/2012 |
| KR | 10-2021-0042161 A | 4/2021 |

OTHER PUBLICATIONS

Feng et al, 2019, SECON 2019 workshop on Security Trust and Privacy in Emerging Cyber-Physical Systems, "MSNET-Blockchain: A New Framework for Securing Mobile Satellite Communication Network" (Year: 2019).*

(Continued)

*Primary Examiner* — Jenee Holland
(74) *Attorney, Agent, or Firm* — NSIP Law (57) ABSTRACT

Disclosed herein are a time synchronization method and apparatus for a low-orbit satellite cluster. The time synchronization method for a low-orbit satellite cluster includes: receiving time information from N participating satellites directly connected; calculating a reference time using time information based on a reliability of each of the N participating satellites; performing time synchronization using the reference time and then recording a synchronization history; and generating a new block using the synchronization history.

4 Claims, 8 Drawing Sheets

(56) References Cited

U.S. PATENT DOCUMENTS

| | | | | |
|---|---|---|---|---|
| 2010/0034136 A1* | 2/2010 | Brener | H04W 56/00 | 370/321 |
| 2010/0087141 A1* | 4/2010 | Agarwal | H04B 7/18513 | 455/13.2 |
| 2013/0329630 A1* | 12/2013 | Becker | H04W 56/0015 | 370/326 |
| 2014/0057649 A1* | 2/2014 | Han | H04W 4/025 | 455/456.1 |
| 2014/0213174 A1* | 7/2014 | Scarpa | H04B 7/18513 | 455/3.02 |
| 2019/0073645 A1* | 3/2019 | Dazin | G06Q 20/065 | |
| 2019/0253134 A1* | 8/2019 | Coleman | H04B 7/18519 | |
| 2019/0317220 A1* | 10/2019 | Kocer | G01S 13/325 | |
| 2019/0353799 A1* | 11/2019 | Grant | H04B 7/1851 | |
| 2020/0059363 A1* | 2/2020 | Lobo | G06F 16/27 | |
| 2020/0084736 A1* | 3/2020 | Regunathan | H04B 7/0695 | |
| 2020/0169425 A1* | 5/2020 | Hofstee | H04L 9/0861 | |
| 2020/0252213 A1* | 8/2020 | Vijayan | G06F 16/275 | |
| 2020/0296114 A1* | 9/2020 | Metzger | G06F 16/27 | |
| 2020/0320220 A1* | 10/2020 | Beno | H04L 9/3239 | |
| 2020/0343968 A1* | 10/2020 | Liu | H04L 45/42 | |
| 2020/0380508 A1* | 12/2020 | Sheriff | G06Q 20/102 | |
| 2021/0027186 A1* | 1/2021 | Sanchirico | H04W 4/70 | |
| 2021/0056544 A1* | 2/2021 | Mitra | G06Q 20/308 | |
| 2021/0168116 A1* | 6/2021 | Shulman | G06F 21/33 | |
| 2021/0231813 A1* | 7/2021 | Camparo | H04B 7/18521 | |
| 2021/0329070 A1* | 10/2021 | Zeng | H04L 9/50 | |
| 2021/0357928 A1* | 11/2021 | Matsunaga | H04L 9/3247 | |
| 2022/0150820 A1* | 5/2022 | Newman | H04W 48/20 | |
| 2023/0262595 A1* | 8/2023 | Newman | H04W 74/0833 | 370/329 |
| 2023/0344271 A1* | 10/2023 | Smith | H02J 50/40 | |
| 2023/0403661 A1* | 12/2023 | Kim | H04W 56/001 | |
| 2024/0264627 A1* | 8/2024 | Tobkin | G06F 1/12 | |

OTHER PUBLICATIONS

Ayman et al, 2021, International Conference on Electronic Engineering, "Literature Review of Blockchain Technology in Space Industry: Challenges and Applications" (Year: 2021).*

* cited by examiner

TIME SYNCHRONIZATION METHOD AND APPARATUS FOR LOW-ORBIT SATELLITE CLUSTER

CROSS-REFERENCE TO RELATED APPLICATION

This application claims priority under 35 U.S.C. § 119(a) to Korean Patent Application Nos. 10-2021-0177311 filed on Dec. 13, 2021, and 10-2022-0044339 filed on Apr. 11, 2022 in the Korean Intellectual Property Office, the disclosures of which are incorporated herein by reference in their entirety.

BACKGROUND

(a) Technical Field

The present disclosure relates to a time synchronization method and apparatus for a satellite cluster through a block chain-based distributed consensus.

(b) Background Art

Recently, large domestic and foreign companies have entered competition in earnest in order to realize (ultra) small satellite cluster-based Internet services based on a huge investment capital, and such competition has been accelerated as time goes on. Accordingly, related satellite control and communication technology has also become more precise.

Low-orbit satellites are satellites that have a lower transmission delay than stationary satellites and are capable of cluster operation to be able to provide global information and communication technology services to more areas on the earth. In order to perform provision of Internet services based on low-orbit communication satellites, cooperative cluster observation through data fusion, and the like, inter-satellite data relay technology to which inter-satellite link technology is applied is essential.

Since the low-orbit satellites fly at a high speed of 7 km/s or more in order to maintain a low altitude, cluster satellite operation technology including more precise communication technology (for eliminating inter-satellite interference) and control technology for setting routes is required.

Inter-satellite synchronization technology for both of control technology (such as formation flight and collision prevention) coping with the movement of satellites that instantaneously change and data communication technology for cluster establishment and cluster maintenance is a key technology for autonomous operation of a low-orbit cluster satellite network.

Synchronization between satellites is required in order to know relative or absolute positions of the satellites, has many obstacle factors such as errors of atomic clocks themselves mounted on the satellites and errors of satellite orbits, and has different types of error factors from devices operating in the atmosphere.

Synchronization technology is a technology that corrects data and a time to ensure that systems operate at the same time, and in particular, the inter-satellite synchronization technology requires a precision in nanosecond units for the precise control described above.

In general, a network time protocol (NTP) is used in order to achieve time synchronization in a network, but in a case of the NTP, a precision is low because a server having a reference time propagates the reference time according to a request and hierarchically propagates the reference time in order to prevent overload of the server.

SUMMARY OF THE INVENTION

An object of the present disclosure is to provide a time synchronization method and apparatus for a satellite cluster through a block chain-based distributed consensus.

Another object of the present disclosure is to provide a time synchronization method and apparatus for a satellite cluster through a block chain-based distributed consensus capable of ensuring robust and fast convergence even in outliers, malicious attacks, and connection and disconnection between various satellites in inter-satellite time synchronization.

According to an aspect of the present disclosure, there is provided a time synchronization method for a satellite cluster through a block chain-based distributed consensus.

According to an embodiment of the present disclosure, there may be provided a time synchronization method for a low-orbit satellite cluster, including: receiving time information from N participating satellites directly connected; calculating a reference time using time information based on a reliability of each of the N participating satellites; performing time synchronization using the reference time and then recording a synchronization history; and generating a new block using the synchronization history.

In the calculating of the reference time, the reference time may be calculated by deriving and then compensating for a time prediction value of a synchronization host satellite using a function that utilizes a weight value of each time information with the reliability of each of the N participating satellites as a weight.

The time synchronization method for a low-orbit satellite cluster may further include propagating the synchronization history to all satellites, wherein a satellite having a nonce value among all the satellites may generate and propagate a new block including the synchronization history.

Degrees of difficulty of new block generation of each satellite may be different from each other according to the reliability of each satellite.

When a new block generation rule is satisfied, the new block including the synchronization history may be generated by the satellite having the nonce value, and when a block generation consensus is reached, the new block may be propagated.

According to another aspect of the present disclosure, there is provided an apparatus performing time synchronization for a satellite cluster through a block chain-based distributed consensus.

According to another embodiment of the present disclosure, there may be provided a low-orbit satellite performing time synchronization including: a communication unit; a memory storing at least one instruction; and a processor executing instruction stored in the memory, wherein the processor performs: receiving time information from N participating satellites directly connected; calculating a reference time using time information based on a reliability of each of the N participating satellites; performing time synchronization using the reference time and then recording a synchronization history; and generating a new block using the synchronization history.

DETAILED DESCRIPTION

Singular forms as used herein include plural forms unless the context clearly indicates otherwise. The term "including", "include", or the like, as used herein is not to be construed as necessarily including all of several components or several steps described herein, and it is to be construed that some of these components or steps may not be included or additional components or steps may be further included. In addition, the terms " . . . unit", "module", and the like, as used herein refer to a processing unit of at least one function or operation and may be implemented as hardware or software or a combination of hardware and software.

Hereinafter, embodiments of the present disclosure will be described in detail with reference to the accompanying drawings.

Figure 1:
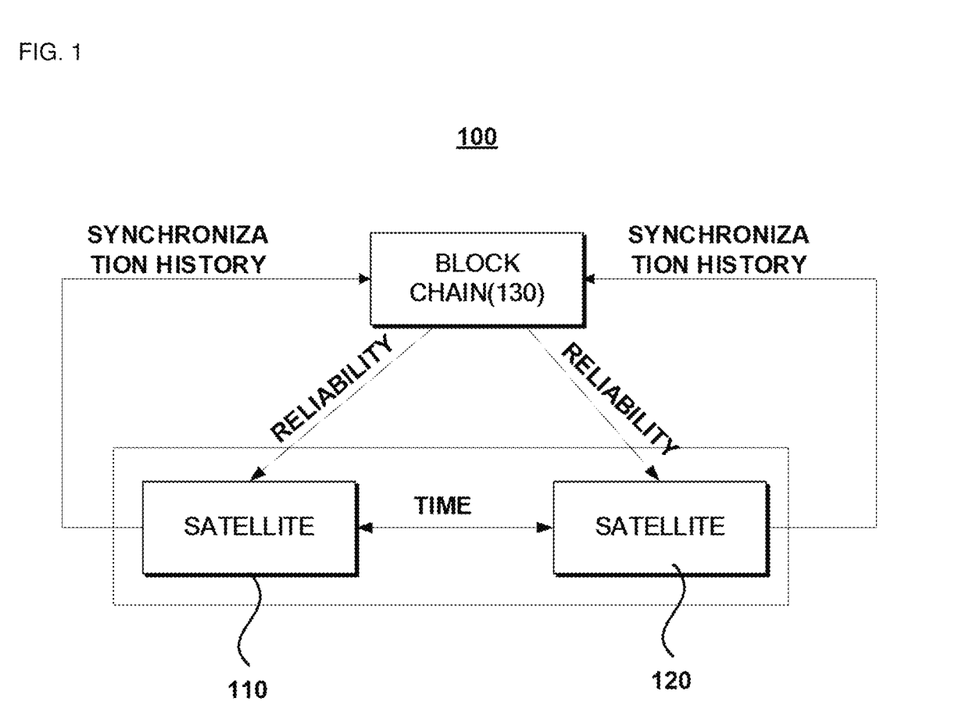
FIG. 1 is a schematic diagram illustrating a time synchronization system for a satellite cluster according to an embodiment of the present disclosure.

FIG. 1 is a schematic diagram illustrating a time synchronization system for a satellite cluster according to an embodiment of the present disclosure.

Referring to FIG. 1, a time synchronization system 100 for a satellite cluster according to an embodiment of the present disclosure includes a plurality of satellites 110 and 120. Here, it is to be understood that the plurality of satellites are low-orbit satellites rather than stationary satellites, and are satellites capable of formation flight (cluster flight).

A connection relationship between the plurality of satellites 110 and 120 communicably connected to each other may be continuously changed according to an orbit and a speed of each satellite. Therefore, in an embodiment of the present disclosure, time synchronization between the satellites may be performed using a block chain so as to match characteristics of low-orbit small satellites between which a connection relationship is changed.

Each of the satellites 110 and 120 may receive a time synchronization history provided through a block chain 130, infer a reliability of each satellite using the time synchronization history of each satellite obtained through the block chain 130, and then perform time synchronization using the inferred reliability. This will be more clearly understood by the following description.

Figure 2:
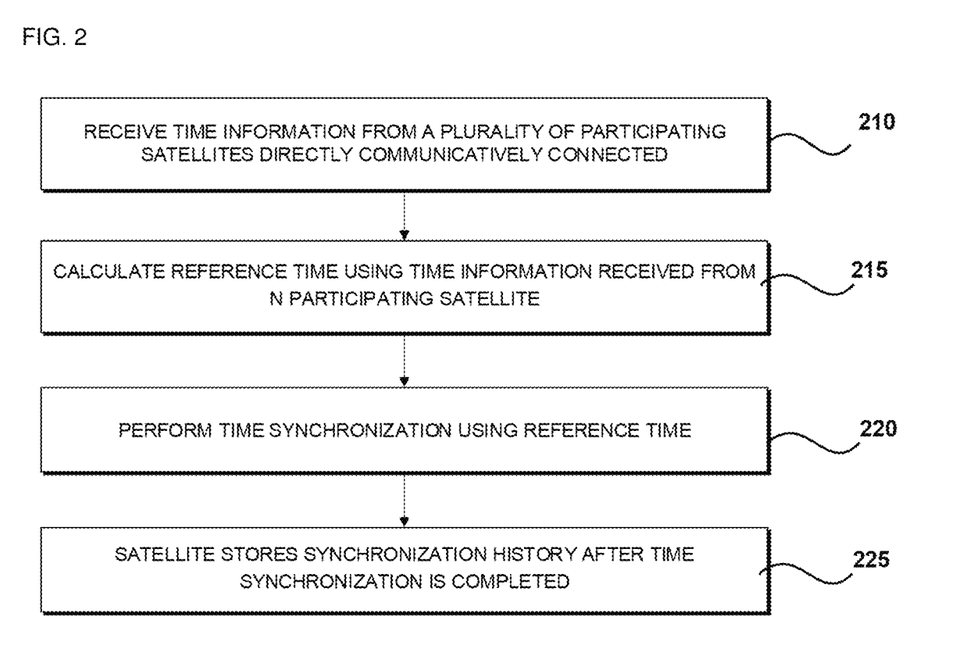
FIG. 2 is a flowchart illustrating a time synchronization method for a low-orbit small satellite cluster according to an embodiment of the present disclosure.

FIG. 2 is a flowchart illustrating a time synchronization method for a low-orbit small satellite cluster according to an embodiment of the present disclosure. Hereinafter, a satellite performing synchronization will be referred to as a synchronization host satellite, and a satellite participating in the synchronization will be referred to as a participating satellite.

In step 210, the synchronization host satellite receives time information from a plurality of participating satellites directly communicatively connected.

This will be described in more detail.

Low-orbit small satellites may have time synchronization periods, respectively, and transmit and receive time to and from N participating satellites directly connected to each satellite for each time synchronization period to perform time synchronization.

To this end, the synchronization host satellite generates a synchronization start signal.

The synchronization host satellite requiring synchronization among a plurality of satellites generates the synchronization start signal and receives consent to synchronization start from other satellites (participating satellites) that may be directly communicatively connected. The synchronization host satellite may start synchronization after consent to synchronization start is received from a reference number or more of participating satellites.

A process of receiving the consent to synchronization is a process of confirming whether or not the satellites have been connected to each other, and time synchronization between satellites that are directly communicatively connected to each other may be performed through such a process. Computational complexity may be reduced by allowing many satellites not to perform synchronization while an easily connected satellite easily starts synchronization.

That is, when the synchronization host satellite generates the synchronization start signal, the synchronization host satellite may receive synchronization start consent signals from the participating satellites that may be directly communicatively connected. When a predetermined number or more of synchronization start consent signals are received, the synchronization host satellite may start synchronization.

When the synchronization consent start signals are received from a predetermined number or more of participating satellites, the synchronization host satellite may receive time information from the participating satellites (i.e., N participating satellites) directly communicatively connected, and transmit time information of the synchronization host satellite to the participating satellites.

In step 215, the synchronization host satellite calculates a reference time using the time information received from the N participating satellites.

In this case, the synchronization host satellite may calculate the reference time using the time information received from each of the N participating satellites based on a reliability of each of the N participating satellites. That is, the synchronization host satellite may calculate the reference time by weighting and averaging the time information received from each of the N participating satellites with the reliability of each of the N participating satellites as a weight.

This will be described in more detail. It is assumed that the time information of the synchronization host satellite is $T_0$ and the synchronization host satellite performs synchronization with two participating satellites.

In this case, it is assumed that time information of the two participating satellites are $T_1$ and $T_2$ that are slower than $T_0$ respectively, and it is assumed that reliabilities of the two participating satellites are $R_1$ and $R_2$, respectively. A compensation value using these values may be calculated as represented in Equation (1).

$$\text{Compensation Value} = \frac{R_1 \times |T_0 - T_1| + R_2 \times |T_0 - T_2|}{(R_1 + R_2)} \quad \text{[Equation 1]}$$

The reference time may be calculated by reflecting the calculated compensation value in the time information of the synchronization host satellite.

In addition, initial reliability weights of all satellites are initialized to fixed values, which may be calculated with reference to a block that is the same synchronization history possessed by each satellite.

A reliability of the satellite may be calculated with reference to a synchronization history in which the satellite is previously participated, and may be calculated in consideration of errors with the neighboring satellites, that is, the consistency of time with the neighboring satellites, which may change depending on an implementation and a situation of the satellite.

For example, a reliability of a specific satellite may be implemented to be inversely proportional to a term corresponding to the sum of errors with the neighboring satellites, and be proportional to a time consistency term indicating that a periodic time difference with the neighboring satellites is small.

In step 220, the synchronization host satellite performs time synchronization using the reference time.

In step 225, the synchronization host satellite stores a synchronization history after the time synchronization is completed. Here, the synchronization history may become basic data for generating a block, and may be utilized as basic data for performing reliability calculation when time synchronization between respective satellites is performed later.

In addition, the synchronization host satellite propagates the synchronization history to all satellites after the time synchronization is completed. The satellites that have received the synchronization history may store the synchronization history in separate storage spaces.

In FIG. 2, a method for the synchronization host satellite to perform time synchronization using a block chain has been described.

A subject performing the time synchronization and a subject issuing and propagating the block may be the same as or different from each other. Accordingly, it will be separately described below with reference to FIG. 3.

Figure 3:
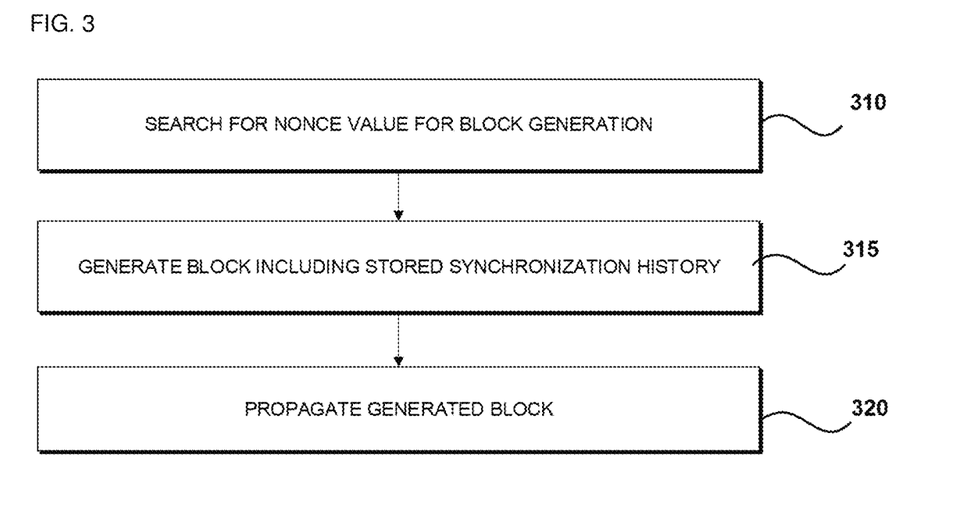
FIG. 3 is a flowchart illustrating a block generation and propagation method according to an embodiment of the present disclosure.

FIG. 3 is a flowchart illustrating a block generation and propagation method according to an embodiment of the present disclosure.

In step 310, each satellite searches for a nonce value for block generation.

Here, a degree of difficulty given at the time of block generation may also be changed depending on the reliability of each satellite. This means that a proof-of-stake type of block generation consensus may be used for the synchronization. That is, in a case of a satellite with a degree of difficulty of 5 and a reliability of 1 given to a current block, a nonce value satisfying the degree of difficulty of 5 should be searched for. However, in a case of a satellite with a reliability of 2, a degree of difficulty of block generation may be modified so that block generation may be admitted even though a nonce value satisfying a degree of difficulty 4 is searched for.

In step 315, a target satellite generates a block including the stored synchronization history.

Here, the target satellite may be a satellite searching for a nonce value.

A new block may be generated according to a constraint condition (block generation rule). For example, the constraint condition may be set in a manner such as 'every n synchronizations'.

As such, the generated new block may be maintained because its generation is completed only when a block generation consensus is reached. For example, a new block may be generated and maintained after a new block generation consensus such as a proof-of-work-based consensus, a proof-of-stake-based consensus, a BFT-based consensus, or the like, is completed.

After the new block generation consensus is completed, the generated new block may be stored while forming a chain, and may also be used to verify a validity of the next block. In addition, as described above, the synchronization history included in each block may be used to infer the reliability of each satellite.

When a block chain is operated based on proof of work, all satellites will have the same block chain as much as possible, and thus, reliabilities of the respective satellites calculated through the synchronization history inside the block chain may be implemented to be the same as each other regardless of any satellite.

As the block chain becomes longer due to accumulation of the time synchronization histories, the reliabilities of the respective satellites may become more accurate, and the synchronization is performed according to the reliabilities, such that the synchronization may be more stably performed, and a synchronization disturbance caused by a malicious satellite may be minimized.

In step 320, the target satellite propagates the generated block.

The satellite that has received the block may compare a synchronization history included in the block with the stored synchronization history and add the block to its own block chain when it decides that there is no tampering in the synchronization history included in the block. When blocks are generated at the same time, different block chains may be generated and collide with each other. In this case, the longest block chain may be accepted and applied.

As such, a consensus in a process of determining one block chain due to collision between the blocks may also be carried out through voting of each satellite. Therefore, according to an embodiment of the present disclosure, a BFT-based proof type of consensus algorithm may be used for synchronization.

Figure 4:
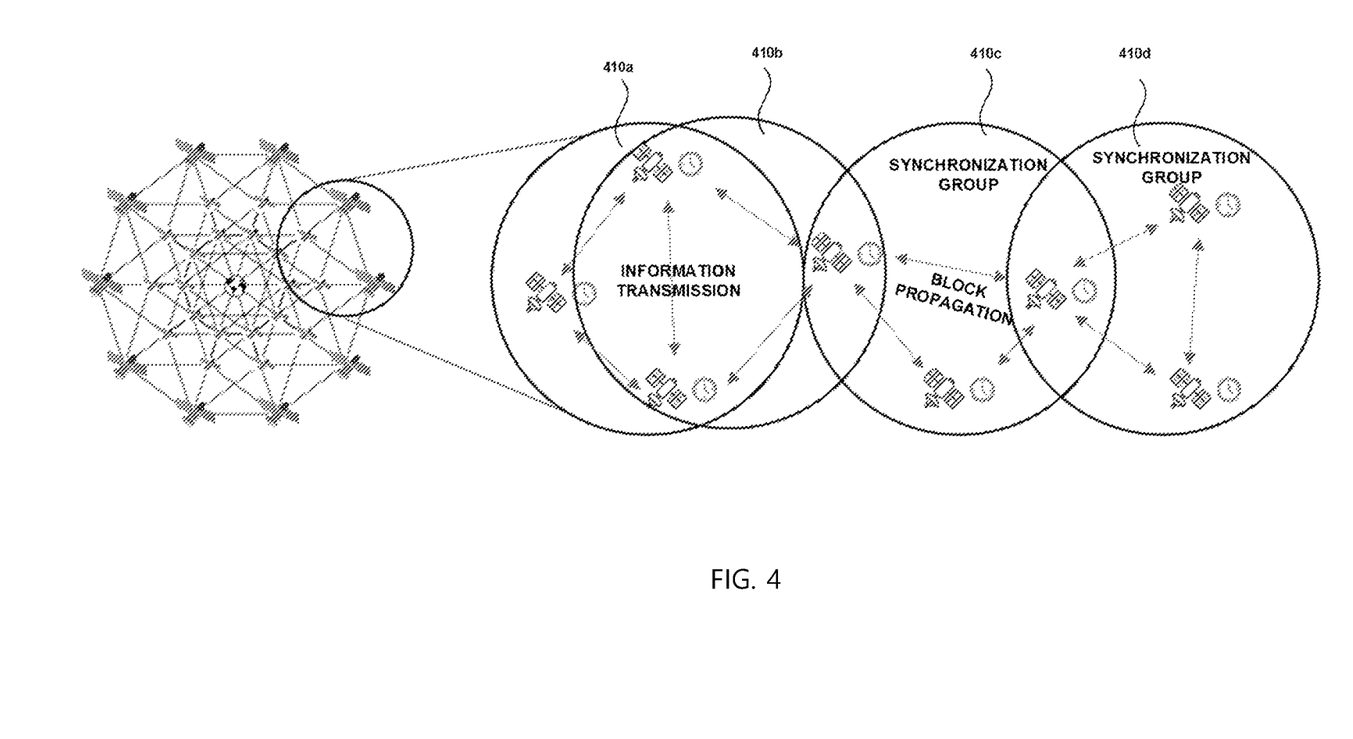
FIG. 4 is a view for describing time synchronization according to an embodiment of the present disclosure.

FIG. 4 is a view for describing time synchronization according to an embodiment of the present disclosure.

As illustrated in FIG. 4, a plurality of synchronization groups may exist. Respective synchronization groups may perform synchronization by transmitting/receiving time information, and accordingly, synchronization histories may be propagated.

As illustrated in FIG. 4, it is assumed that a first synchronization group 410*a*, a second synchronization group 410*b*, a third synchronization group 410*c*, and a fourth synchronization group 410*d* exist. As described with reference to FIG. 2, the respective synchronization groups may exchange time information between satellites directly communicatively connected to each other, infer reliabilities based on information provided through a block chain, and then derive and compensate for a weighted average value of the time information received by the respective satellites with the reliabilities as weights to calculate the reference times.

The respective synchronization groups may perform synchronization using respective reference times, and record respective synchronization histories after the synchronization is completed, and propagate the recorded synchronization histories to all satellites. Accordingly, the respective satellites may receive and store the synchronization histories.

Thereafter, as described with reference to FIG. 3, the respective satellites may search for nonce values, generate blocks including the stored synchronization histories, and then propagate the blocks.

Figure 5:
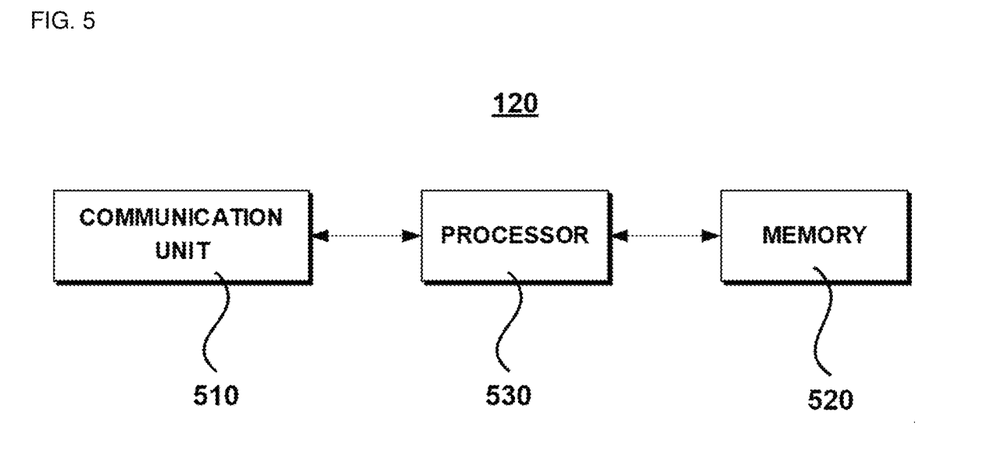
FIG. 5 is a schematic block diagram illustrating internal components of a low-orbit satellite according to an embodiment of the present disclosure.

FIG. 5 is a schematic block diagram illustrating internal components of a low-orbit satellite according to an embodiment of the present disclosure.

Referring to FIG. 5, a low-orbit satellite according to an embodiment of the present disclosure is configured to include a communication unit 510, a memory 520, and a processor 530.

The communication unit 510 is a unit for transmitting and receiving data to and from other satellites through a communication network.

The memory 520 stores various instructions for performing a block chain-based time synchronization method according to an embodiment of the present disclosure.

The processor 530 is a unit for controlling internal components (e.g., the communication unit 510, the memory 520, etc.) of the low-orbit satellite according to an embodiment of the present disclosure.

In addition, the processor 530 may execute the instructions stored in the memory 520, and the instructions executed by the processor 530 may perform respective steps as described with reference to FIGS. 2 to 3. These steps are the same as those described above, and an overlapping description thereof will thus be omitted.

Figure 6:
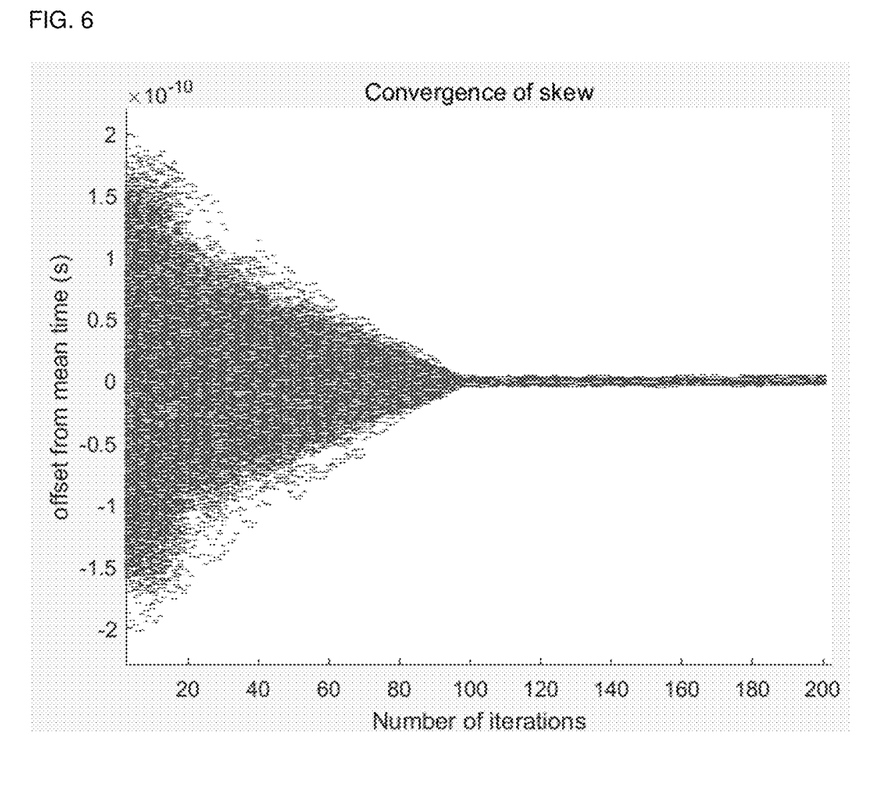
FIG. 6 is a view illustrating a time synchronization result of low-orbit satellites according to an embodiment of the present disclosure.

FIG. 6 is a view illustrating a time synchronization result of low-orbit satellites according to an embodiment of the present disclosure.

It can be seen from FIG. 6 that as a simulation progresses, times of individual satellites are synchronized to one time, through which it can be seen that the time synchronization is correctly performed like other time synchronization algorithms.

Figure 7:
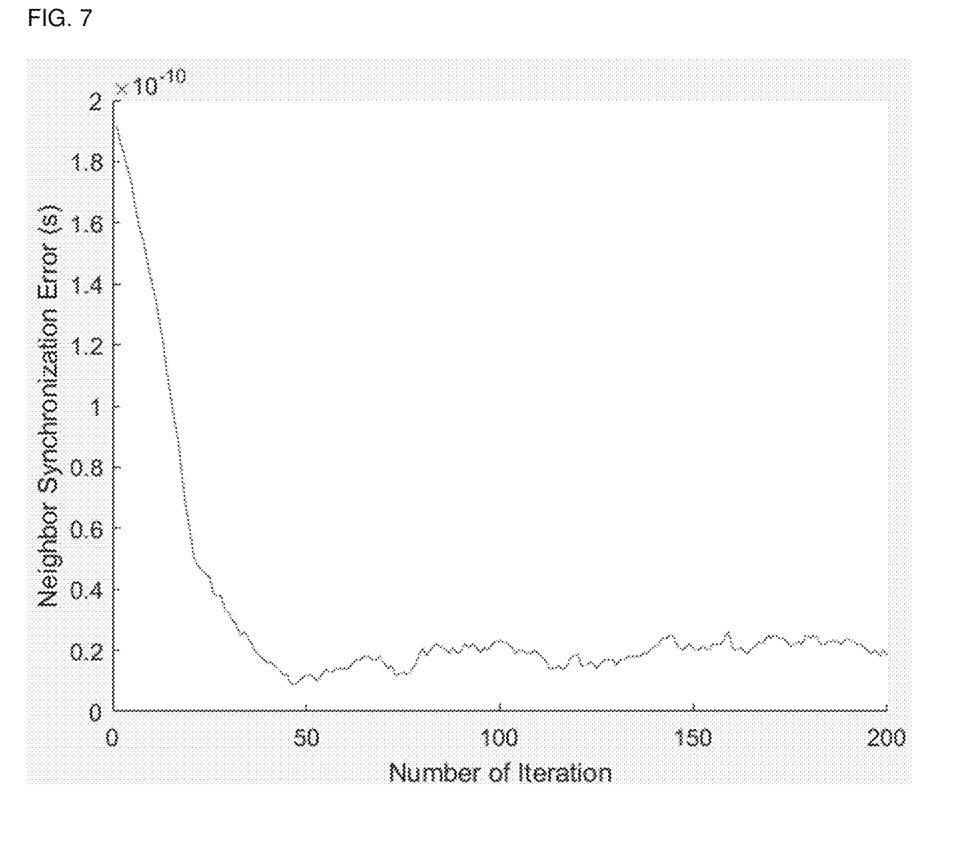
FIG. 7 is a view illustrating a time synchronization result of low-orbit satellites according to another embodiment of the present disclosure.
Figure 8:
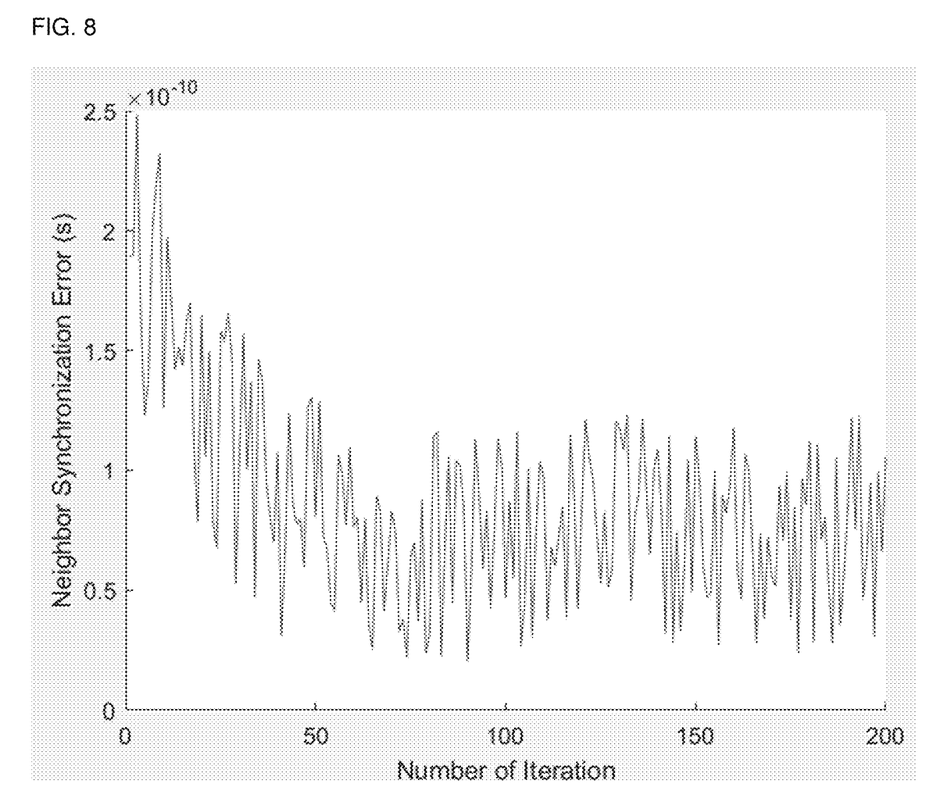
FIG. 8 is a view illustrating a time synchronization result of low-orbit satellites according to the related art.

FIG. 7 is a view illustrating a time synchronization result of low-orbit satellites according to another embodiment of the present disclosure, and FIG. 8 is a view illustrating a time synchronization result of low-orbit satellites according to the related art.

FIGS. 7 and 8 illustrate display results of time differences between two specific neighboring satellites when time synchronization of low-orbit satellites is performed, respectively. It can be seen in FIG. 7 that a fluctuation is less in the present disclosure than the related art (FIG. 8), such that the time synchronization is excellently performed in the present disclosure.

According to an embodiment of the present disclosure, the present invention may ensure robust and fast convergence even in outliers, malicious attacks, and connection and disconnection between various satellites in inter-satellite time synchronization by providing a time synchronization method and apparatus for a satellite cluster through a block chain-based distributed consensus.

In addition, the present disclosure may make a system robust against involuntary malicious satellites by evaluating a reliability of each satellite through a block admitted by a plurality of satellites and selecting a reference signal through the reliability of each satellite to reach a common consensus.

In addition, the present disclosure may improve convenience of maintenance of an entire system by sharing a synchronization history between satellites.

The apparatus and the method according to an embodiment of the present disclosure may be implemented in the form of program commands that may be executed through various computer units and be recorded in a computer-readable recording medium. The computer-readable recording medium may include program commands, data files, data structures, or the like, alone or in combination. The program commands recorded in the computer-readable recording medium may be specially designed and constituted for the present disclosure or be known to and usable by those skilled in a computer software field. Examples of the computer-readable recording medium may include magnetic media such as hard disks, floppy disks, and magnetic tapes; optical media such as compact disk read only memories (CD-ROMs) and digital versatile disks (DVDs); magneto-optical media such as floptical disks; and hardware devices specially configured to store and execute program commands, such as ROMs, random access memories (RAMs), and flash memories. Examples of the program commands include high-level language codes capable of being executed by a computer using an interpreter, or the like, as well as machine language codes made by a compiler.

The above-described hardware devices may be constituted to be operated as one or more software modules in order to perform operations of the present disclosure, and vice versa.

Embodiments of the present disclosure have been mainly described hereinabove. It will be understood by those skilled in the art to which the present disclosure pertains that the present disclosure may be implemented in a modified form without departing from essential characteristics of the present disclosure. Therefore, embodiments disclosed herein should be considered in an illustrative aspect rather than a restrictive aspect. The scope of the present disclosure should be defined by the claims rather than the above description, and equivalents to the claims should be interpreted to fall within the present disclosure.

What is claimed is:

1. A time synchronization method for a low-orbit satellite cluster, comprising:
    receiving time information from N participating satellites directly connected;
    calculating a reference time using time information based on a reliability of each of the N participating satellites;
    performing time synchronization using the reference time and then recording a synchronization history;
    generating a new block using the synchronization history;
    propagating the synchronization history to all satellites,
    wherein a satellite having a nonce value among all the satellites generates and propagates a new block including the synchronization history; and
    wherein degrees of difficulty of new block generation of each satellite are different from each other according to the reliability of each satellite.

2. The time synchronization method for a low-orbit satellite cluster of claim 1,
    wherein in the calculating of the reference time, the reference time is calculated by deriving and then compensating for a time prediction value of a synchronization host satellite using a function that utilizes a weight value of each time information with the reliability of each of the N participating satellites as a weight.

3. The time synchronization method for a low-orbit satellite cluster of claim 1, wherein when a new block generation rule is satisfied, the new block including the synchronization history is generated by the satellite having the nonce value, and when a block generation consensus is reached, the new block is propagated.

4. A low-orbit satellite performing time synchronization, comprising:
    a communication unit;

a memory storing at least one instruction; and
a processor executing instruction stored in the memory,
wherein the instructions executed by the processor perform:
- receiving time information from N participating satellites directly connected;
- calculating a reference time using time information based on a reliability of each of the N participating satellites;
- performing time synchronization using the reference time and then recording a synchronization history;
- generating a new block using the synchronization history;
- propagating the synchronization history to all satellites,
- wherein a satellite having a nonce value among all the satellites generates and propagates a new block including the synchronization history; and
- wherein degrees of difficulty of new block generation of each satellite are different from each other according to the reliability of each satellite.

* * * * *